No. 724,409. PATENTED MAR. 31, 1903.
P. LALOR.
CASH REGISTER.
APPLICATION FILED MAR. 22, 1899.
NO MODEL. 9 SHEETS—SHEET 1.
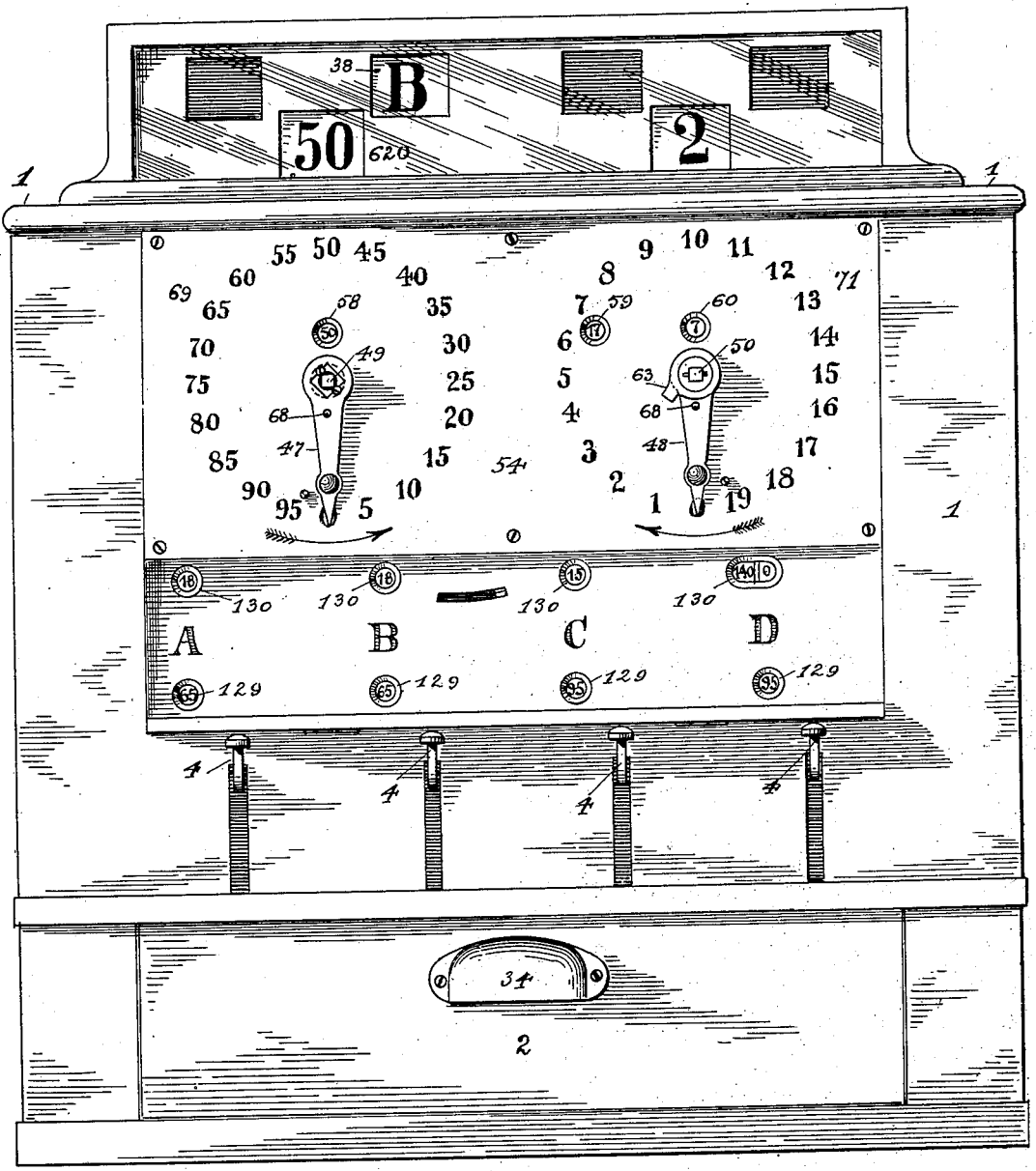
Fig. I.
Witnesses. Inventor.
Patrick Lalor

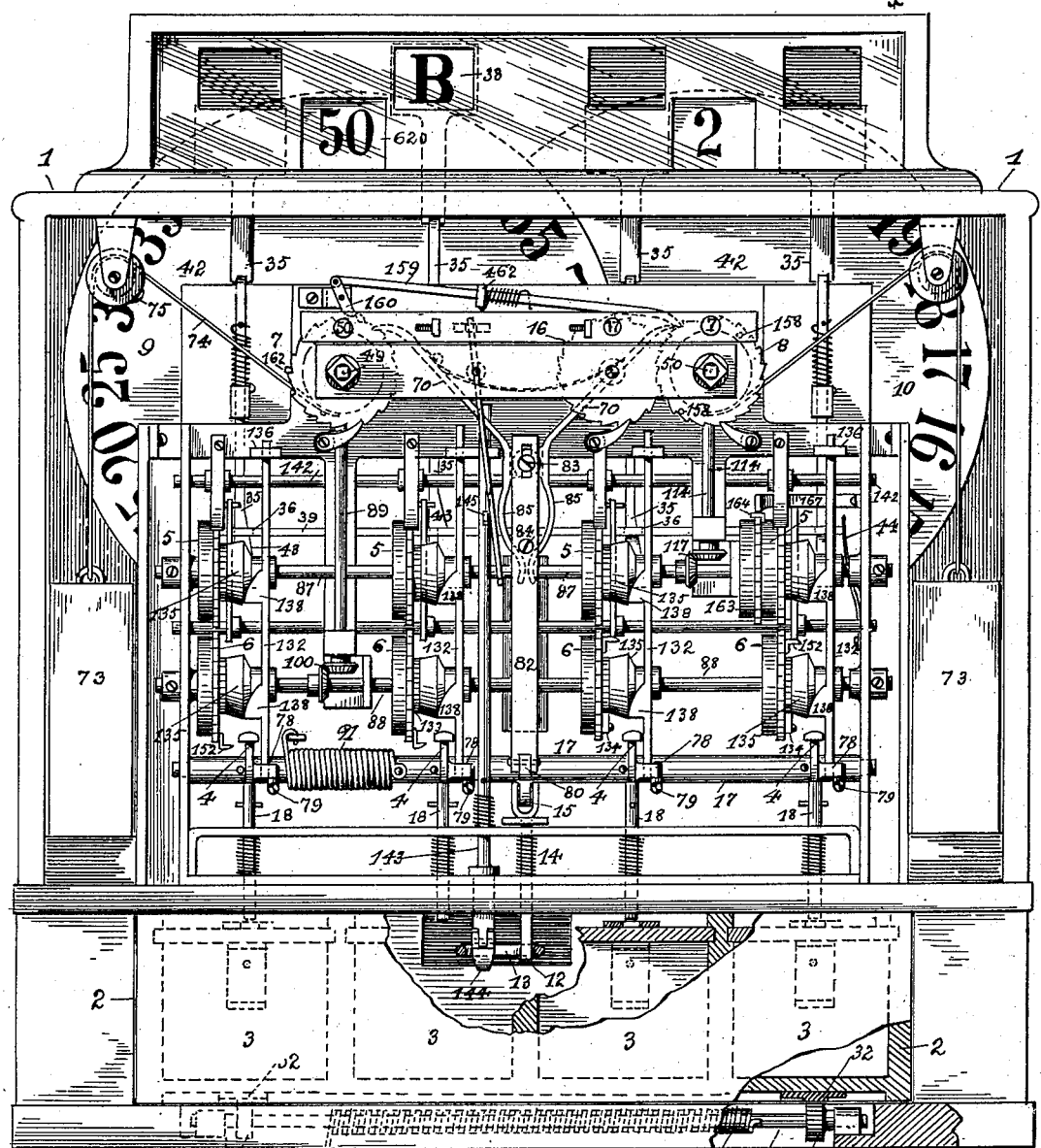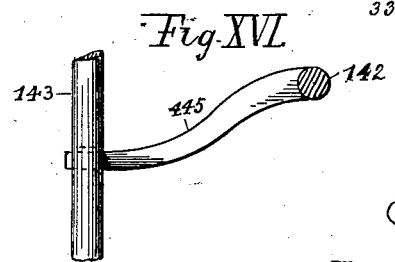

No. 724,409. PATENTED MAR. 31, 1903.
P. LALOR.
CASH REGISTER.
APPLICATION FILED MAR. 22, 1899.
NO MODEL. 6 SHEETS—SHEET 3.
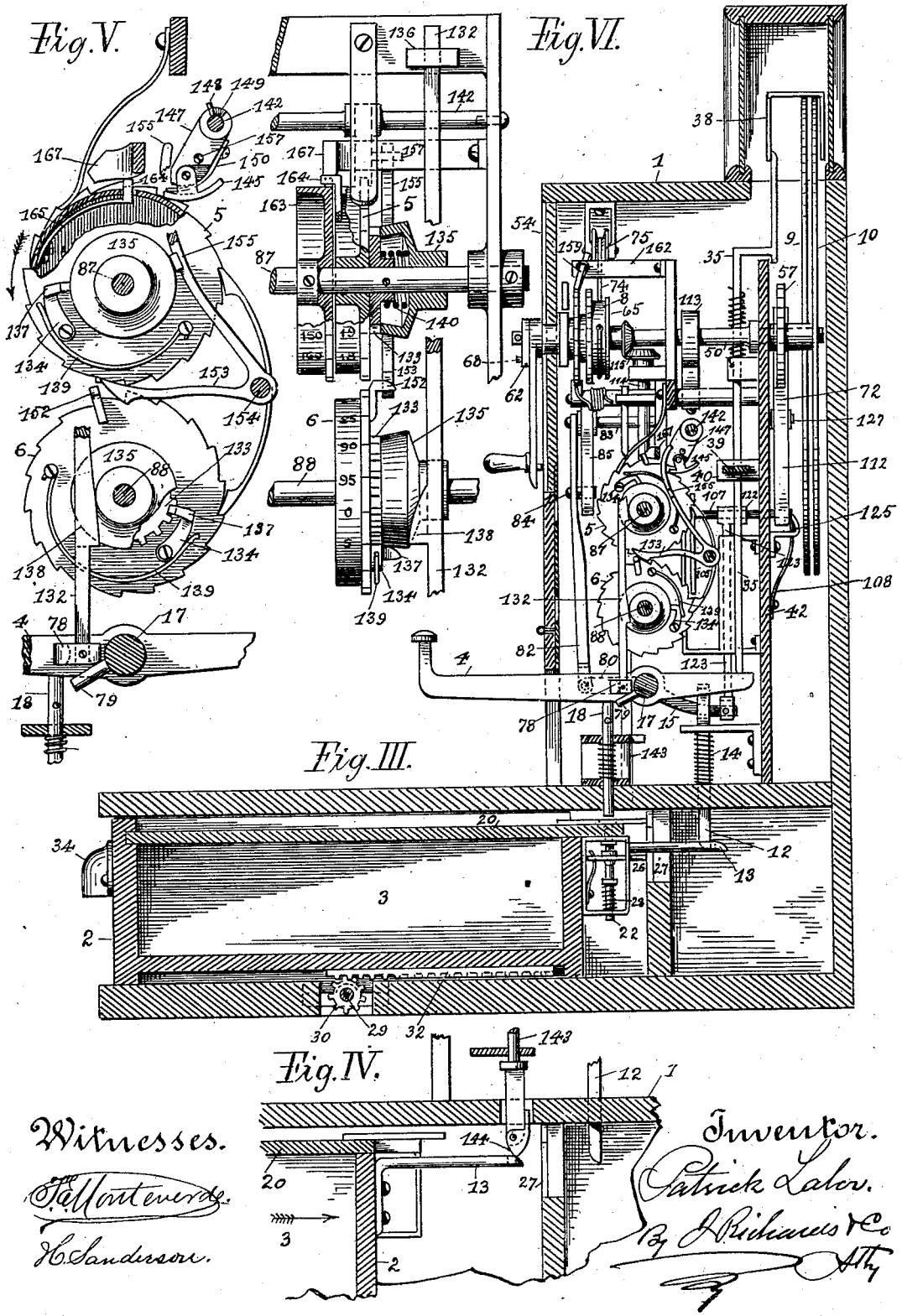

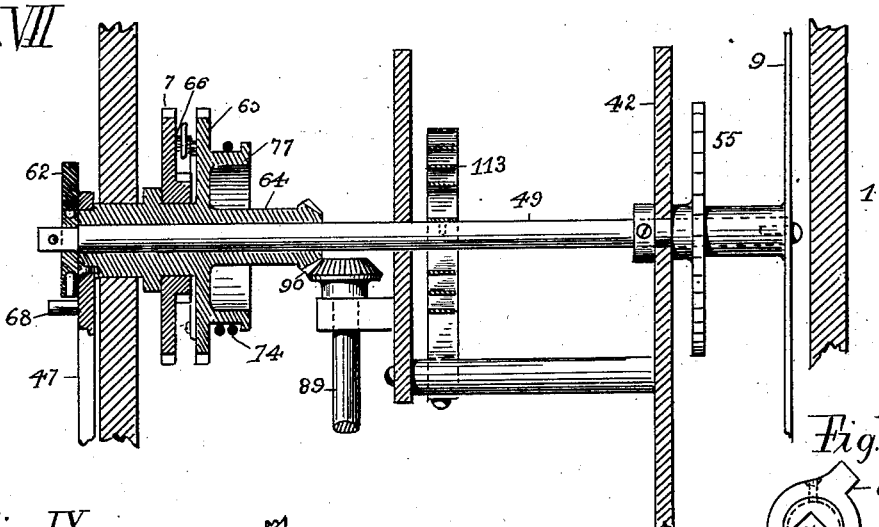
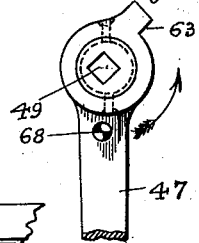
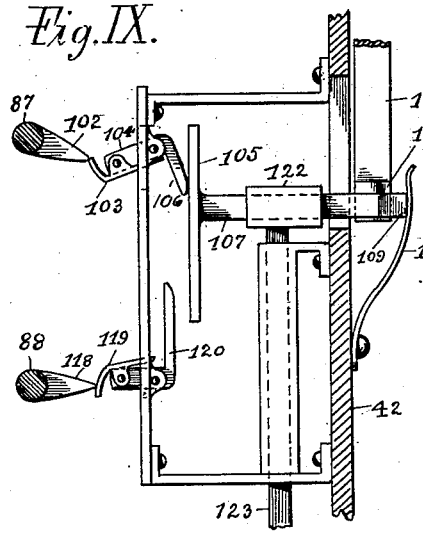
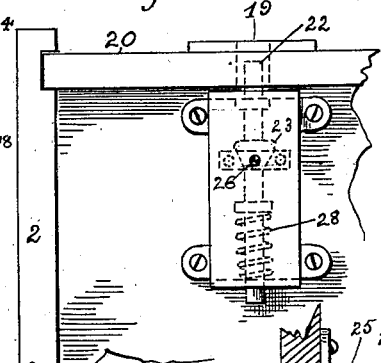
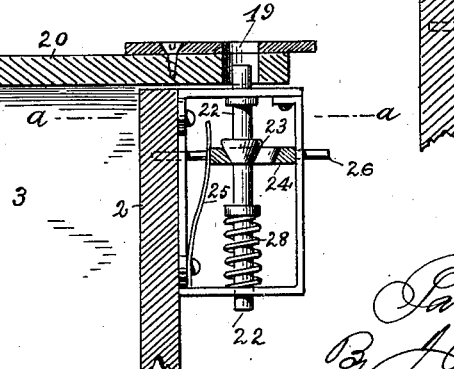

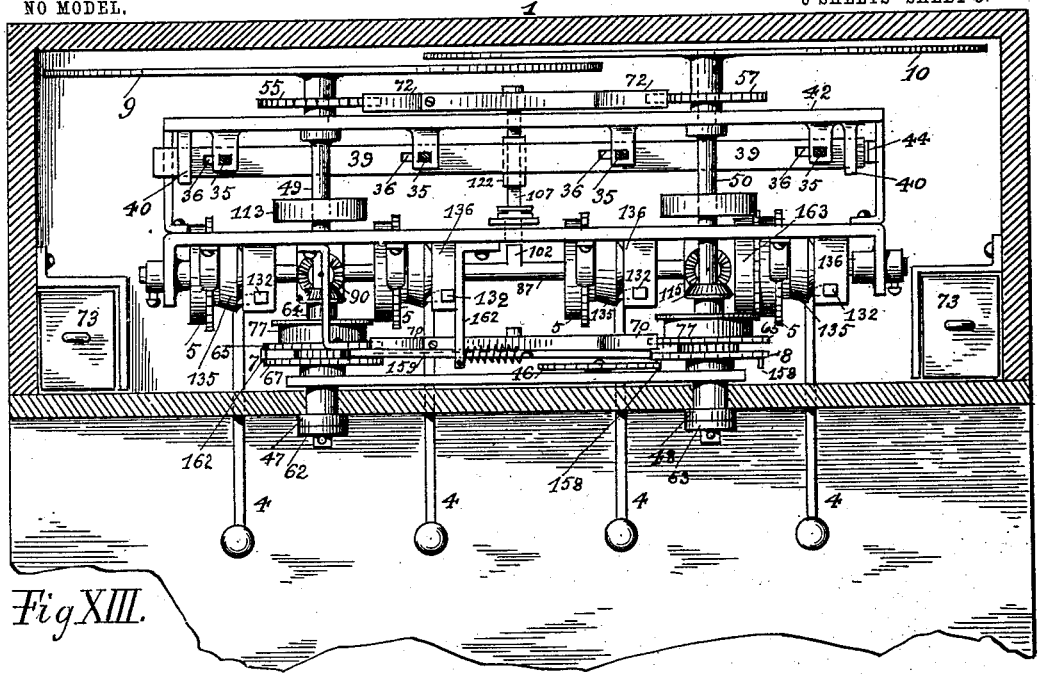

No. 724,409. PATENTED MAR. 31, 1903.
P. LALOR.
CASH REGISTER.
APPLICATION FILED MAR. 22, 1899.
NO MODEL. 6 SHEETS—SHEET 6.
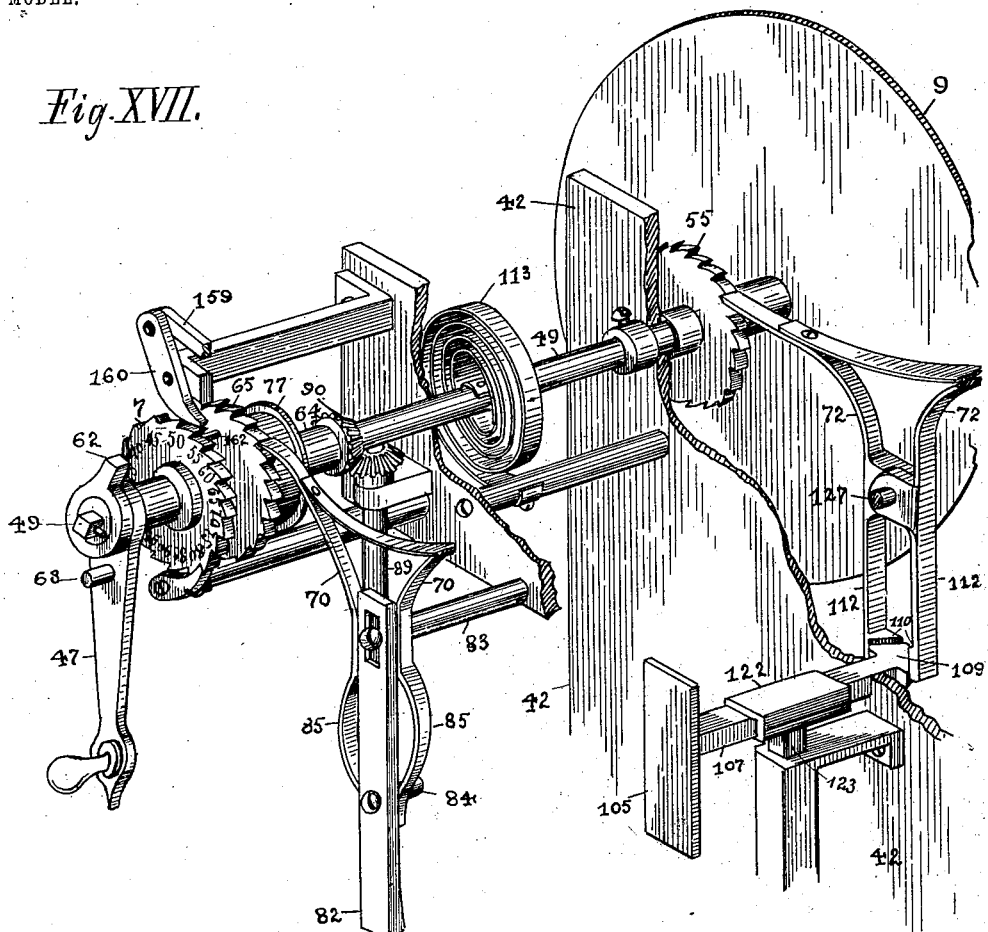
Fig. XVII.
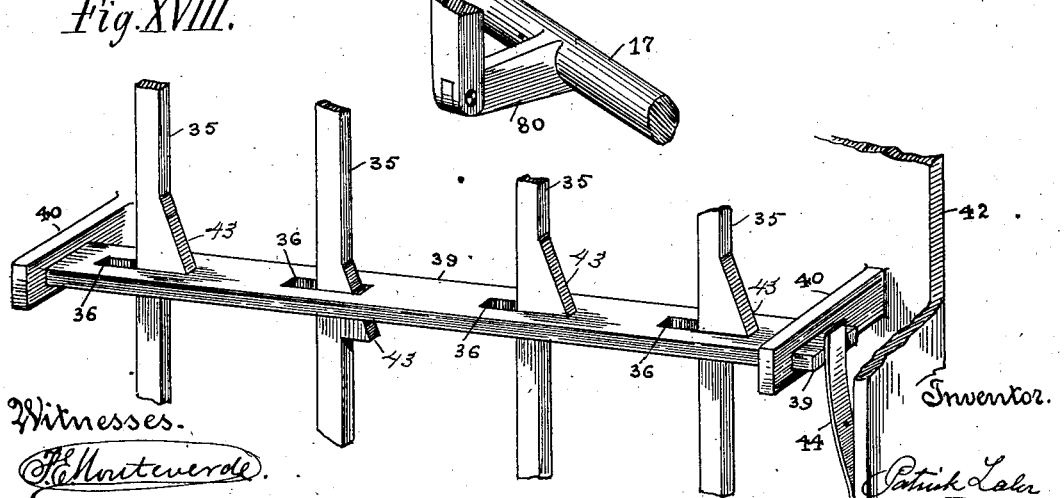
Fig. XVIII.
Witnesses.
Inventor.

UNITED STATES PATENT OFFICE.

PATRICK LALOR, OF SAN FRANCISCO, CALIFORNIA, ASSIGNOR, BY MESNE ASSIGNMENTS, TO NATIONAL CASH REGISTER COMPANY, OF DAYTON, OHIO, AND JERSEY CITY, NEW JERSEY, A CORPORATION OF NEW JERSEY.

CASH-REGISTER.

SPECIFICATION forming part of Letters Patent No. 724,409, dated March 31, 1903.

Application filed March 22, 1899. Serial No. 710,097. (No model.)

*To all whom it may concern:*

Be it known that I, PATRICK LALOR, a citizen of the United States, residing at San Francisco, county of San Francisco, and State of California, have invented certain new and useful Improvements in Cash-Registers; and I hereby declare the following to be a full, clear, and exact description of the same, reference being had to the accompanying drawings, forming a part of this specification.

My invention relates to improvements in cash-registers, and more particularly to cash-registers of the type employing a plurality of cash-receptacles for the different clerks or departments.

One of the objects of the invention is to provide an improved form or construction of independent cash-receptacles which may be utilized for different clerks or departments, whereby the sales of these clerks or departments may be kept separated.

A further object of the invention is to provide improved cash-receptacles for different clerks or departments and also improved accounting devices for recording separately the transactions of the different clerks or departments to which the respective receptacles are allotted.

Another object of the invention is to provide a series of improved cash-receptacles with a series of individual counters or accounting devices for the respective receptacles and a grand-total counter for recording transactions belonging to any of the first-mentioned accounting devices or departments.

The invention consists of certain novel constructions, combinations, and arrangements of parts, all of which will be hereinafter more particularly set forth and claimed.

Referring to the drawings, Figure I represents a front view of one of my improved cash-registering machines. Fig. II is a similar view of the same machine with the front cover removed, showing the main operating mechanism in elevation and with a portion of the depository-drawer broken away to expose the locking devices therefor. Fig. III is a section transverse to Figs. I and II on the line *x x* in Fig. II. Fig. IV is an enlarged detail showing the drawer-locking mechanism in a plane opposite to Fig. II. Fig. V is an enlarged view of the counting-wheels to register the amount and sum of deposits. Fig. VI is a view, partially in section, of Fig. V at a right angle thereto. Fig. VII is a section through the plane of one of the main actuating-spindles. Fig. VIII is an enlarged detail of the eye of the index-crank and the manner of its engaging the main indicating-disks. Fig. IX is an enlarged detail showing the escape devices for the main disks that indicate the amount of deposits. Fig. X is an enlarged vertical section through the locking devices for the individual tills in the depository-drawer. Fig. XI is a rear elevation of the locking devices shown in Fig. X. Fig. XII is a section through Fig. X on the line *a a*. Fig. XIII is a horizontal section through the main casing and top view of the mechanism therein. Fig. XIV is a partial view of the indicating-disks for deposits and of the escape devices for holding and releasing the same. Fig. XV is a detail of Fig. XIV in a plane at right angles thereto. Fig. XVI is a detail of the counter-operating mechanism. Fig. XVII shows in perspective an enlarged view of one of the main moving spindles and its accessories. Fig. XVIII is an elevation in perspective of the mechanism by means of which the personal symbols are displayed or observed.

Similar characters of reference are applied to corresponding parts in the various figures of the drawings.

Referring first to the several elements that go to make up my improved cash indicating and registering machine, these consist of a main case 1, in which all the operating parts are contained, a depository-drawer 2, having compartments or tills 3, as indicated by dotted lines in Fig. II, a row of press levers or keys 4, corresponding to the tills 3 and for the use of an equal number of individual depositors designated by letters or other symbols, as shown at B, Figs. I and II, three sets of rotative counters 7 and 8 and 16 for the sum-total of the amounts registered by the personal counters 5 and 6, indicating-disks 9 and 10 for dollars and cents or other denominations of money deposited, and devices to lock and unlock the main depository-drawer 2.

The depressible levers or keys 4 are loosely mounted on an oscillating rod 17, turned in one direction by the levers 4 coming in contact with the pins 79 and retracted or returned by a strong coil-spring 91, as shown in Fig. II.

The drawer 2 is locked by a bolt 12, that engages the staple 13, the forward end of the latter being beveled, as seen in Figs. III and IV, so that when the drawer 2 is shoved in the staple 13 slightly raises the bolt 12 and permits it to fall, assisted by the action of the spring 14, and engage the staple 13.

The bolt 12 is raised and the drawer 2 unlocked by means of the lever 15 on the oscillating rod 17, which lever passes through an elongated slot in the bolt 12, as shown in Fig. III, so that when the rod 17 is turned by depressing either of the keys 4 or when a deposit is to be made by either of the persons to whom these keys are allotted. As, however, the tills 3 are independently locked, access is gained to these severally by the mechanism shown in Figs. X, XI, and XII, now to be described.

When either of the keys 4 is depressed, the lever thereof comes in contact with one of the pins 18, and this passing down through the holes 19 in the sliding till covers or guards 20 strikes on the top of its respective bolt 22, depressing it below the cover 20, so this latter is released, but is still held by the pin 18, so the drawer 2 will slide out by means to be presently described and the till-cover 20 will be detained, and thus expose the proper till. When the bolts 22 are depressed, the conical collars 23 thereon come in contact with the sliding detents 24, pushing these back against the face of the springs 25 until the collars 23 pass through and below the detents 24. Then the latter are moved back by the spring 25, as shown in Fig. X, locking the bolts 22 and leaving the till-cover 20 free until the drawer 2 is again run in. Then the projecting ends 26 of the detents 24 strike against a plate 27 at the rear, and thus shove the detents 24 back, so the bolts 22 are thrown upward by the coil-springs 28, again locking the till-covers 20. When the drawer 2 is disengaged by the bolt 12, it is run out and opened automatically in the following manner: Beneath the drawer 2 in the bottom of the main casing 1 is placed a revoluble rod or shaft 29, having at the ends toothed pinions 30, that engage the racks 32, attached to the bottom of the drawer 2, as shown in Fig. III. When the drawer 2 is pushed in, the racks 32 engage the pinions 30, turning the shaft or rod 29, and thereby winding a coil-spring 33, placed around the rod 29, so that when the bolt 12 is raised the torsional tension of this spring runs the drawer 2 back and out automatically. A common pull 34 is provided to complete the outward movement of the drawer in case the weight of the contained coin or other cause prevents complete action of the coil-spring 33. In this manner it will be seen that the drawer 2 is unlocked by depressing either of the keys 4 and is automatically relocked when closed; also, that depressing either of the keys 4 unlocks one till in the drawer 2 corresponding to that key and to the person to whom this key and till are allotted; also, that all the tills are locked automatically when the drawer 2 is run in or closed. The keys 4, acting as levers, perform a number of different functions or operations besides those already named, one of which is to raise the stems 35, on the top of which are the symbols 38, that indicate the individual depositors to which the keys 4 are allotted, exhibiting their personal symbol, as at B in Fig. II.

The stems 35 at their middle portion pass through elongated holes or mortises 36 in a sliding bar 39, held at each end in bearings 40, attached to the back plate, as seen in Fig. XIII and shown enlarged in Fig. XVIII. On the sides of these stems 35 at the bar 39 are angular projections or teeth, as at 43 in Fig. II, that when either of these stems 35 is raised and the bar 39 is moved to the left by the spring 44 catch on top of the bar 39, preventing them from descending when released by the keys 4, and thus keep the symbol 38 displayed until another one of the keys 2 is depressed. The construction is fully shown enlarged in Fig. XVIII, in a perspective view. Supposing the stems 35 to be in the position shown in Figs. I and II, the second one raised and locked at 43, and that either of the other keys 4 is depressed, the corresponding stem 35 will be raised and the inclined face at 43, bearing against one end of the mortise 36 in the bar 39, will move that to the right against the spring 44, and thereby disengages any other of the stems 35 that may have been previously raised, permitting them to fall by their gravity, and thus obscure their symbols 38 at the top.

Leaving now for the present the operations performed by the keys 4 and reverting to the primary registering devices and at first to Fig. I, where the front plate 54, from which all readings are made, is shown in position, the index-pointers 47 and 48 operate in one direction the spindles 49 and 50, that pass through the index-plate 54 and back through the framing of the machine to receive the indicating-disks 9 and 10 and the ratchet-wheels 55 and 57, both fastened thereon behind the main plate 42, as shown in Fig. XIII. The spindles 49 and 50 form the primary supports for the sum-total counters 7 and 8, that exhibit their register through the apertures 58 and 60 in the plate 54, as seen in Fig. I and to be hereinafter more fully described. The spindles 49 and 50 and the disks 9 and 10 thereon are turned by the two drivers 62 63, (shown enlarged in Figs. VII and VIII), one of which devices, 63, is shown in place in Fig. I and the other, 62, in place in Figs. VI, VII, and XVII.

It may be here explained that the machine is in respect to many of its operating parts divided into two parts, one for cents and one for dollars, and it will in some cases simplify explanation by referring to such parts in the singular. I will therefore in describing such duplicate parts first refer to the left-hand side, that registers cents or the unit denomination of the money deposited.

Referring first to Fig. VII, the index-crank 47 is fastened to the sleeve 64, made integral with the ratchet-wheel 65, which wheel and sleeve turn loosely on the spindle 49 and partake of all movements of the index-crank 47. The counting-wheel 7 for indicating the number of cents deposited has a circular row of figures from "5" to "95" on its face, that are exhibited through the aperture 58, and is moved by means of the wheel 65, having an engaging pawl 66 in the usual manner of rotary counters. The counting-wheel 7 is mounted loosely on the sleeve 64, turns but in one direction, and when it has made a complete revolution transfers its count to the second of the sum-total counters 8, as will be hereinafter explained. When the crank-index 47 is turned forward, as indicated by the arrow in Fig. I, the pin 68 in the face of the crank 47 engages the driver 62, revolving the stem 49, the ratchet-wheel 65, counter-wheel 7, and the indicating-disk 9, the latter having a corresponding but larger scale of figures that exhibit above at 620 until the next deposit is made a like amount to that indicated by the crank-index 47 on the scale 69. When the crank-index 47 is set to the amount deposited—for example, to twenty-five cents or one-fourth of a revolution on the scale 69— it is held in that position by one of the pawls 70, which engages the ratchet-wheel 65, and the disk 9 is also held in a corresponding position or to indicate the same amount by means of one of the pawls 72 engaging the ratchet-wheel 55, as seen in Figs. XIV and XVII. To return the index-crank 47 to its downward or zero position or reset it for the next deposit, I employ in this case a weight 73 and cord 74, passing over an idle pulley 75 and wound around the drum extension 77 of the ratchet-wheel 65, as shown in Figs. II and VII. I do not, however, confine myself to this method of revolving or returning the pointers 47 48, the counters, and other corresponding parts. Springs can be employed instead of weights.

Still describing the left-hand side of the machine, the release of the index-crank 47, the ratchet-wheel 65, and the sleeve 64 is performed by either of the keys 4 in the following manner: When either of these keys is depressed, the studs or stops 78 in the sides thereof engage the pins 79, set in the oscillating rod 17, and partially turn this rod, which releases the pawl 70, that engages the ratchet-wheel 65 in the following manner: Projecting forward from the middle of the oscillating rod 17 is a short lever 80, (shown in dotted lines in Fig. VI and full lines in Fig. XVII,) to which is attached a vertical sliding bar 82. This bar is guided at the top by the stud 83, on which the pawls 70 are pivoted, as shown in Fig. II. On the inner face of this bar 82 is a spreading-pin 84, that passes between and expands the bent extensions 85 of the pawls 70, and thus raises these pawls out of contact with the ratchet-wheels 65, permitting this wheel, the sleeve 64, and the index-crank 47 to be rapidly turned back by the falling weight 73 on the left-hand side of the machine. The disk 9, having indicated at 620 a like amount with that of the index-crank 47 on the scale 69, is retained by the ratchet-wheel 55 and pawl 72, so this amount will remain visible until another deposit is to be made and is then released and returned back to the initial or zero point in the following manner: Across the front of the machine and forming the axial support of the individual or personal counters 5 and 6 are two revoluble shafts 87 and 88. The latter is geared positively to the sleeve 64 by means of the vertical spindle 89, the bevel-wheels 90 at the top, and the bevel-wheels 100 at the bottom, as seen in Figs. II and VII, so the shaft 88 partakes of all movements of the ratchet-wheel 65, the sleeve 64, and the index-crank 47, so that when the latter is turned to indicate on the scale 69 the shaft 88 is turned a like distance, releasing the disk 9 in the following manner: On this shaft 88 is a projecting lug 118, (seen in Fig. IX,) that engages on its upward stroke only a hinged pawl 119 on the bell-crank 120, the vertical arm of which then presses against the cross-head 105 on the sliding stem 107, pushing and moving it forward. The sliding stem 107, of which a top view is seen in Fig. XV, has an oblique-formed or arrow head 109, that enters as a wedge between the inward-projecting annular ledges 110 on the extensions 112 of the pawls 72, spreading and opening these until the head 109 engages in the notches 124 and is held there, thereby disengaging the pawls 72 from the ratchet-wheels 55. The wheel 55, the spindle 49, and disk 9, being thus released and free to turn, revolve backward by the action of the coiled spring 113 (seen in Figs. VII, XIII, and XVII) until the driver 62 at the front comes in contact with the pin 68 in the crank 47. This brings the disk 9 back to zero of the scale 620 or coincident with the crank 47, wherever that may be on the scale 69, and ready to indicate the amount of the new deposit to be made. When the stem or bolt 107 is pressed forward, the arrow-head 109 engages in the notches 124 and is held there until released by one of the keys 4 being depressed, as will be presently explained. This operation of releasing and returning the disk 9 to zero on the scale 620 or to a position corresponding to that of the crank 47 on the scale 69 is repeated on the other side of the machine by the crank 48 for registering dollars; but in order to render this more clear I will follow through the corresponding movements produced by the index-crank 48. This crank is geared to the oscillating shaft 87 by means of the vertical spindle 114 and the bevel-wheels 115 and 117, as seen in Figs. II and III, the same as on the other or unit side of the machine, and this shaft 87 is provided with a lug 102, that when the spindle is revolved engages the pivotal pawl 103 on the bell-crank 104 and presses the inner end 106 of this bell-crank 104 against the cross-head 105, sliding the stem 107 and releasing the pawls 72, the ratchet-wheels 55 and 57, and the disks 9 and 10, as before described in the case of registering cents at the other side 5 of the machine. The disks 9 and 10 being thus set free and returned to zero on the scale 62 or to correspond with the position of the cranks 47 and 48 on the scales 69 and 71, it is evident that when the registering or index cranks 47 or 48 are again turned with the disks 9 or 10 the pawls 72 must be again engaged, so that when the cranks 47 and 48 are released and fall back by action of the weights 73 the disks 9 and 10 will remain to exhibit the last deposit. This is accomplished in the following manner: It will be observed that the stem or bolt 107 slides in a long bearing 122 on top of the stem 123. By referring to Fig. III it will be seen that this stem 123 connects to the lever or arm 15 on the oscillating rod 17, so that when any one of the keys 4 is depressed the stem 123 is raised and the one 107 is moved upward laterally, so the arrow-head 109 (seen in Fig. XV) is raised above the ledges 110 on the extensions 112 of the pawls 72 and is released and moved back as it rises by the guide 108 permitting these extensions 112 to close together at the bottom and the pawls 72 to engage the ratchet-wheels 55 and 57 at the top, so the disks 9 and 10 are held in their position and the sum of the last deposit appears on the scale 62 until another is made, also in the dollar-scale—as, for example, in Fig. II—where the reading is two dollars and fifty cents. It will be understood that in resetting either of the index-cranks 47 or 48 their respective disks 9 and 10 are engaged by the pawls 72 in the manner before explained.

125 is a guard or guide for the ends of the extensions 112, which are not sufficiently sustained by the pivot 127 where the pawls 72 are fulcrumed. The pawls 103 and 119 on the bell-cranks 104 and 120 are pivoted so as to engage but one way, as will be understood.

This much explains the operative parts of my improved cash-registering machine, except the counters and the manner of their operation.

First referring to the sum-total counters 7, 8, and 16, that exhibit through the apertures at 58, 59, and 60, these are common two-disk decimal-counters, or, as in the present case, have a base or notation to suit for half-dimes and dollars. Each of these counter-wheels 7, 8, and 16 is provided at the bottom with catch-pawls, as shown in Fig. II, to prevent backward movement. The series of counters 5 and 6 on the rods 87 and 88 are to register individual deposits by different persons in cents and dollars, (indicated by the symbols at 38,) that correspond to the keys 4 below, each key having two counters, one for dollars and one for cents, so the sum-total for deposits for each key or depositor will appear through the apertures 129 and 130, as seen in Fig. I. The counters 5 and 6 are of the two-disk decimal type, but with a relation or difference of one to twenty to suit half-dimes and dollars. They are mounted loosely on the shafts 87 88, but are clutched thereto by action of the keys 4 in the manner shown in Figs. V and VI. First referring to Fig. II, it will be seen there are four vertical sliding bars 132, each connected to a corresponding key 4 at the bottom and held by suitable bearings 136 at the top. These bars engage and disengage the counters 5 and 6, as hereinafter explained.

Referring now to Figs. V and VI, which show enlarged views of the counters 5 and 6, the ratchet-wheels 133 are fastened to the shafts 87 88 and are engaged by the pawls 134 on the loose counter-wheels 5 and 6, and, as the rods 87 and 88 are geared to the stems 49 and 50, as has already been described, any motion of the register-crank 47 and 48 will turn either of the counters 5 and 6 accordingly when their respective clutches are engaged by means of the pawls 134. These pawls 134 are held out of contact by means of the conical sliding clutches 135, pressed inward against the ratchet-wheels 133 by means of the oblique wedges 138 on the stems 132. The pawls 134 have projecting lugs 137, that come in contact with and are moved outward by the exterior beveled faces of the clutches 135 and are pressed inward by the springs 139 in the usual manner of such pawls. In this manner it will be seen that all the counters 5 and 6 are normally out of contact with the rods 87 88 and the register-cranks 47 and 48 until one of the keys 4 is depressed and the corresponding stem 132 descends. Then the oblique wedges 138, moving downward, release the clutches 135, which are pressed outward by the coil-springs 140, permitting the pawls 134 to engage, and the corresponding counter 5 or 6 is turned accordingly. This latter action takes place when the register-stems 49 or 50 are turned backward, and the cranks 47 or 48 are reset by means of the weights 73. In other words, when any person to whom the keys 4 are allotted makes a deposit, registers the same, and presses his key 4 the counters 5 and 6, corresponding to this key, will be engaged and count equal to the dollars and cents registered on the scale 69 71.

The upper or dollar counters 5, besides being operated by the dollar register-crank 48, have also to be actuated by the registering-crank 47 for cents in any case when the amount already registered by the counters 6 and an additional amount deposited will exceed one dollar. Then the counter 5 must be operated from or in conjunction with the counters 6. In other words, when the counters 6 for cents have made one revolution or register up to one dollar then the upper counters 5 must register accordingly. This supplementary movement of the counters 5 is derived from movement of the drawer 2, but is controlled by the counters 6 in the following manner: Passing across the machine parallel to and above the rods 87 88 is another oscillating rod 142, operated by a vertical sliding stem 143, raised by the staple 13 on the drawer 2 striking obliquely against the bottom of the stem, as seen in Fig. IV. The hinged tripping-pawl 144 is to prevent any action as the drawer is drawn out or opened. On the rod 142 is a lever 445, that passes through the stem 143, as shown enlarged in Fig. XVI, so that when this stem 143 is raised by the staple 13 the rod 142 is turned part of a revolution accordingly and operates the dollar-counters 5 by means of a hinged pawl 145 on the arm or lever 149, as seen in Figs. V and III. The arm 147 is not rigidly fastened on the rod 142, but is free to move through a certain degree of arc as the pin 148 and the width of the slot 149 will permit. In Fig. V the pawl 145 is shown resting on rim of the counter-wheel 5, held by a spring 150, the pin 148 bearing against the rear side of the same. In this position the rod 142 is free to oscillate without moving the arm 147, and the pawl 145 slips over the teeth or notches in the counter-wheel 5 as it turns, no action taking place until the lower or corresponding counter 6 for cents makes one revolution. Then a tripping-stud 152 on the counter-wheel 6 engages the bell-crank 153, pivoted at 154, and the upper arm 155 of this bell-crank (shown broken in Fig. V) is thrown back and strikes against a pin 157 in the arm 147, turning that on the rod 142 until the pin 148 will bear against the opposite or rear side of the slot 149, so that at the next movement of the rod 142 the arm 47 will be moved forward by this rod and the pawl 145 will engage one tooth or notch in the counter-wheel 5 and turn the latter forward one space, counting one dollar accordingly by the notation assumed. These devices described in the singular are common to all the counter-wheels on the shafts or rods 87 and 88. During the next revolution of the counting-wheel 6 the arm 147 and the pawl 145 remain in the position seen in Fig. V until another dollar is to be transferred and counted by the counter-wheel 5 in the manner just described.

The sum-total counter 8 when the machine is, as in this case, arranged for registering with a multiple of twenty is divided into two parts or two counting-wheels 8 and 16, as shown in Fig. II, indicating dollars and tens of dollars at 59 and 60 in Fig. I, where the right-hand figures at 60 indicate dollars and the left-hand figures at 59 indicate tens of dollars, the sum showing in the drawings being one hundred and seventy-seven dollars. The counter-wheel 16 for tens of dollars is operated by two pins 158 in the counter-wheel 8, that at each half-revolution of the latter engages one tooth in the counter-wheel 16 in the usual manner of such counting devices. The counter-wheel 8 for dollars is operated by the registering-crank 48, as before explained, but must also register dollars from the counter 7. When the amounts there reach that sum, this latter is accomplished in the following manner: Referring to Fig. II, a long pawl 159 is attached to a vibrating lever 160, passes through a bearing 462, and engages the counter 8, as shown by dotted lines. The vibrating lever 160 is operated by a tripping-stud 162 on the inside of the counter-wheel 7, that at each revolution of the latter engages the lever 160, drives the pawl 159 forward, turning the counting-wheel 8 one division or for one dollar in the scale 60. (Shown in Fig. I.)

In the individual sum-total counters 5 there is also an additional counter-wheel 163 for tens of dollars (seen at the left of the counter 5 in Fig. II, also in section in Figs. V and VI) and is operated from the adjacent counter-wheel 5 in the following manner: In the counter-wheel 5 is a bent or angular pawl 164, held and pressed outward by a spring 165, as shown in Fig. V. On the side of this pawl is an extension (seen in Fig. VI) adapted to engage in the teeth of the counter-wheel 163, but held outward and clear of this wheel until the angular projection 164 passes beneath a stationary guide 167, which depresses the pawl and causes it to mesh into the teeth or spaces of the wheel 163 and holds the pawl in contact until the latter wheel is turned one space, representing ten dollars at the left or at 130 in Fig. I. Then the pawl 164, having passed beneath the stationary guide 167, is instantly projected outward by the spring 165 and passes around clear of the teeth of the wheel 163 until it comes again in contact with the guide 167.

This ends the descriptive portion of the main operating parts of my improved cash-registering machine, except as to simple parts, the objects of which are obvious without any explanation—as, for example, the various detents and pawls to prevent back motion of revoluble parts, as seen beneath the counters 7, 8, and 16 in Fig. II, also various springs for retractile or other purposes, as on the bolts 18, the purpose of which will be understood.

Referring now to the manner of operating and supposing the machine to consist of four elements or is arranged for four depositors, as in the present example, and that a depositor B, to whom the second key 4 is allotted, is to make a deposit of two dollars and fifty cents, and that his counter 6 for cents in the scale 130 already indicates sixty cents, the first operation is to turn the register-crank 48 to the figure "2" on the scale 71 to register two dollars on the scale 71, then turn the register-crank 47 to "50 cents" on the scale 69 to register the cents. He then presses down his key 4 of the element B, which performs several operations—namely, raises the stem 123, which lifts arrow-head 109 above ledges 110, allowing pawls 72 to engage with ratchet-wheels 55 and 57; engages the clutches of his individual counter-wheels 5 and 6; releases ratchet-wheels 65, which are then run back by descent of the weights 73; raises and exposes his symbol B at top; unlocks his till 3 in the drawer 2 and arranges to uncover the same, and finally releases the main drawer 2, which opens automatically. The deposit is then made in the till 3 and the drawer 2 closed, which latter operation performs several operations—namely, locks the drawer and the till that had been opened and also corrects or adds, if necessary, a further sum of one dollar to the register of the deposit—as, for example, if, as before assumed, the depositor's register for cents 6 stood at "60 cents" on the scale 130 when his deposit was made and fifty more cents added, making one dollar and ten cents, it is obvious that the dollar-counter 5 in his element or division should advance one space. This latter is performed by closing the drawer and action of the stem 132, bell-crank 153, rod 142, and pawl 145, as has been already described. In this manner it will be seen that my improved cash-register keeps and exhibits a sum-total of all cash deposited, a separate register of the amounts deposited by different persons, a sum-total of these individual deposits, adds the amount of all these individual deposits to the sum-total in the drawer 2 and indicates the name or symbol of the last depositor and the amount of his last transaction, and also keeps each depositor's money in a separate till and inaccesible to the other depositors; in fact, keeps a separate cash account with each depositor and an account between all depositors and the total cash contained in the drawer 2.

It will be understood that many of the devices I have shown and described have obvious mechanical equivalents capable of operating in practically the same manner and attaining like results. For example, modification of the various details would be required for money of a different denomination. I do not therefore confine myself to the precise construction of the various subordinate parts to carry out my invention.

It will be understood that the operator of the machine in depressing his particular special or department key will depress the pin 22 and release the drawer. The opening movement of the drawer will have been commenced before pressure upon the key is removed, and the latching-plate 24 will thus be released and moved over the part 23 to retain the pin 22 in its depressed position. It will also be understood that I have shown registering devices in the present application for keeping the accounts of the several clerks separated only as one instance or form of mechanism which may be employed for this purpose, it being well within the scope of this invention to provide other accounting devices—such, for instance, as any of the well-known forms of printing mechanisms for keeping these accounts separated—whereby the amount of cash that should be found in each receptacle can be ascertained.

Having thus described in as complete a manner as I am able the nature and objects of my invention and a successful manner of constructing and applying the same, what I claim as new, and desire to secure by Letters Patent, is—

1. The combination with a movable cash-receptacle divided into independent compartments, guarding means for said receptacle, and means for changing the relative positions of the receptacle and the guarding means by the movement of the receptacle, whereby one or another of said compartments is exposed as predetermined.

2. In a cash-register, a sliding money-repository having a plurality of compartments designed to be separately exposed, automatic covers for said compartments, and manipulating devices for said machine allotted to the different compartments for determining which one shall be exposed when the machine is operated and the repository slid to open position.

3. In a cash-register, a movable money-repository divided into compartments and designed to be moved to open position at each operation of the machine, guarding means normally closing said compartments and adjustable to expose the same singly when the repository is opened, and selective manipulating devices for the machine allotted to the different compartments with provisions for automatically determining which one of the same shall be exposed in an operation of the register.

4. In a cash-register, a money-receptacle divided into compartments and movable from closed to open position and vice versa, movable covers for said compartments designed to separately expose them when the repository moves to open position, and selective manipulating means for the machine predetermining which compartment shall be exposed when the machine is operated.

5. In a cash-register, a sliding money-repository divided into compartments, sliding covers for said compartments designed to separately expose them when the repository is slid to open position, and selective manipulating devices for the machine for predetermining which compartment shall be exposed when the machine is operated.

6. In a cash-register, a money-repository divided into compartments and movable from closed to open position and vice versa, covers for the several compartments, means for locking the covers over the compartments, and selective manipulating devices for the machine with provisions for unlocking the cover of the particular compartment to be exposed when the repository opens, the selected compartment being exposed with the opening of the repository while the remaining cover or covers continue locked.

7. In a cash-register, a sliding money-repository divided into compartments, separate covers for the compartments, means for locking the covers, and selective manipulating devices for the machine with provisions for unlocking a certain cover to predetermine which compartment shall be exposed when the repository slides to open position in any operation of the machine.

8. In a cash-register, a movable money-repository divided into compartments and adapted to be opened in each operation of the machine, and separate controlling devices for said compartments with means for automatically uncovering the selected compartment when the repository opens.

9. In a cash-register, a money-repository divided into compartments and movable from closed to open position and vice versa, means for covering the compartments with provisions for determining which one shall be exposed when the repository is moved to open position, and manipulating devices for selecting a compartment.

10. In a cash-register, a sliding money-repository divided into compartments, means for covering said compartments with provisions for predetermining which one shall be exposed when the repository is slid to open position, and manipulating devices for selecting a compartment.

11. In a cash-register, the combination with a movable cash-receptacle divided into compartments, of independent covers for said compartments, selective locking devices securing the covers in position over the compartments, and normally-restrained spring means for automatically changing the relative positions of covers and repository to expose the desired compartment.

12. In a cash-register, the combination with a movable cash-receptacle divided into compartments, of independent covers for said compartments, a latch for the receptacle, latches for the covers, and automatic cover-controlling means brought into operation upon the release of the receptacle.

13. In a cash-register, the combination with a cash-receptacle divided into compartments, of independent covers for said compartments, a common means for automatically changing the relative positions of the covers and compartments, and restraining means operated at will for permitting the automatic means to act, with provisions for predetermining which compartment shall be exposed.

14. In a cash-register, the combination with a money-repository divided into compartments, and movable from closed to open position and vice versa, sliding covers for the several compartments, and means dependent upon the movement of the repository for changing the relative positions of a selected cover and the repository to expose the desired compartment.

15. In a cash-register, the combination with a framework, a sliding drawer therein having separated compartments, of a sliding cover-plate for each of said compartments, and mechanism whereby the opening of the drawer results in the cover-plate of one of said compartments moving outward with the drawer and the cover-plate of the remaining compartment remaining in its inner position.

16. In a cash-register, a drawer divided into a series of separate receptacles, a series of movable covers for said receptacles, means for securing each cover over its receptacle, means for releasing any desired cover, and means for moving said drawer together with all the covers except said released cover from beneath the released cover.

17. The combination with a movable-compartment money-drawer having separate sliding covers for the different compartments, of locks for the several covers normally securing them in position over the compartments, and selective unlocking devices with provisions for holding back the unlocked cover when the drawer opens.

18. The combination with a movable-compartment money-drawer having separate sliding covers for the different compartments, of locks for the several covers normally securing them in position over the compartments, and selective unlocking devices operating to hold back the unlocked cover when the drawer opens.

19. The combination with a movable-compartment money-drawer having separate sliding covers for the different compartments, of locks for the several covers normally securing them in position over the compartments, and selective unlocking devices engaging the sliding covers to hold back the same when unlocked and when the drawer opens.

20. In a cash-register, a drawer divided into a series of separate receptacles, a series of independent covers for said receptacles, a latch arranged to lock each cover over its receptacle, a series of pins arranged to be thrown each into engagement with one of said covers and its latch, and means for throwing any one of said pins.

21. In a cash-register, a drawer divided into a series of separate receptacles, a series of independent covers for said receptacles, a latch arranged to lock each cover over its receptacle, a series of pins arranged to be thrown each into engagement with one of said covers and with the latch, and a series of character-keys arranged to throw said pins.

22. In a cash-register, a drawer divided into a series of separate receptacles, a series of independent covers for said receptacles, a series of latches arranged to lock each cover over its receptacle, a series of pins arranged to be thrown each into engagement with one of said latches, and a series of character-keys arranged to throw said pins.

23. In a cash-register, a rotary shaft, an indicating-disk fixed upon said shaft, having a circular scale of numerals thereon, a sleeve on said shaft revoluble independently thereon, register-wheels on said sleeve, a crank-pointer secured upon said sleeve, a fixed circular scale of numerals over which the said pointer moves, a stud on said pointer, and a stop or lug affixed to said rotary shaft, in the path of said stud, whereby the pointer engages and moves the indicator-disk as it revolves, and carries said disks to an indication similar to that denoted on the fixed scale by the pointer, substantially as specified.

24. In a cash-register, rotary shafts, indicator-disks fixed on said shafts, displaying series of numerals thereon, sleeves on said shafts revoluble independently thereon, register-wheels on said sleeves, crank-pointers secured upon said sleeves, traversing over fixed circular scales of numerals, lug connections between said pointers and said rotary shafts, whereby said disks are caused to revolve by the movement of the pointers, means for returning the pointers to position, and independent means for returning the indicator shafts and disks to position coincident with that of the crank-pointers as numerically indicated, substantially as specified.

25. In a cash-register, rotary shafts bearing indicator-disks having circular numeral-scales for indicating the amounts deposited, main register-wheels sleeved upon said shafts and revoluble independently thereon, crank-pointers secured to the said revoluble sleeves, moving over fixed numerical scales, lug connections between said pointers and said rotary indicator-shafts, whereby the latter are rotated, individual counting-registers, mechanical connections between said individual counting-registers and said main register-wheels through the revoluble sleeves, intermediate gears and clutches and individual keys whereby the said mechanical connections are brought into operation, substantially as specified.

26. In a cash-register, rotary shafts bearing indicator-disks having circular numerical scales for indicating the amounts deposited, main register-wheels sleeved upon said shafts and revoluble independently thereon, crank-pointers secured to said revoluble sleeves, moving over fixed numerical scales, lug connections between said pointers and said rotary indicator-shafts, whereby the latter are rotated, individual counting-registers connected by gears and clutch mechanism with said revoluble sleeves, and individual keys controlling said clutch mechanism, substantially as specified.

27. In a cash-register, rotary shafts, indicator-disks fixed upon said shafts, bearing circular scales of numerals on their faces, sleeves on said shafts revoluble independently thereon, main register-wheels on said sleeves crank-pointers secured upon said sleeves, traversing over fixed scales of numerals, lug connections between said pointers and said rotary shafts and disks, means for resetting the said register-wheels at stated intervals, independent means for resetting indicator-disks to correspond with the crank-pointers, individual counting-registers, mechanical connections between said individual registers and the sleeved register-wheels, clutches for bringing said mechanical connections into and out of operation, individual symbols corresponding to the individual registers, and individual keys for operating said clutches, for exposing the individual symbol and for causing the pointers to return to zero, substantially as specified.

28. In a cash-registering machine, a main depository-drawer having divisions or tills therein, means to separately lock the drawer and the tills, and a series of depressible keys each of which unlock the main drawer and one till to which the depressible key pertains, substantially as specified.

29. In a cash-register, a main depository-drawer, having compartments, or tills, a series of individual operating-keys corresponding to the several tills, individual symbols corresponding to the said keys respectively, means to display said symbols when said keys are operated, rotary indicator-shafts, with indicator-disks on said shafts to display amounts deposited, main rotary register-wheels sleeved upon said shafts, with independent rotation thereon, crank-pointers connected with said register-wheels, and lug connections between said crank-pointers and said rotary indicator-shafts, whereby the latter are operated by the said pointers, substantially as specified.

30. In a cash-registering machine, a main depository-drawer having a series of divisions or tills, a series of depressible keys corresponding to the tills and to certain depositors to whom the keys are allotted, rotary indicating-disks that display the amount of the next preceding deposits in the tills and devices operated by the depressible keys to release these rotary indicating-disks, so they can be reset to indicate a new deposit, substantially as described.

31. In a cash-register, rotary shafts, indicator-disks secured upon said shafts, bearing numerical series for displaying the amounts deposited, main register-wheels sleeved upon said shafts, crank-pointers connected with said main register-wheels through said sleeves, moving over fixed numerical scales, mechanical connections whereby the movements of the said pointers move the said disks to a similar numerical indication, detents for engaging and holding the disks to the number thus indicated, means for returning the said pointers to zero while the indicator-disk is held, and independent means for returning the indicator-disks to the position indicated by the pointers, substantially as specified.

32. In a cash-registering machine, rotary crank-pointers and a circular scale of figures traversed thereby showing the amounts deposited in cents and dollars or other money denominations operated by these pointers, a series of separate counters to register deposits made by different persons, a series of keys, one for each depositor, that when depressed will engage and cause the counter belonging to that key or person to operate so as to maintain a separate register for each person, means for indicating the individual deposits, and means for displaying the sum-total deposits until substantially displayed by a succeeding deposit, substantially as specified.

33. In a cash-registering machine, indicating-pointers and a circular scale of figures traversed thereby to show primarily the amount of money-deposits made, a series of revoluble counters mounted on one rod or shaft by which the number of cents in amounts deposited by each person is registered, and parallel to these another series of revoluble counters similarly mounted that register the number of dollars in deposits made by each person, substantially as specified.

34. In a cash-register, rotary shafts, indicator-disks fixed upon said shafts, main register-wheels sleeved upon said shafts, independently revoluble thereon, rotary crank-pointers connected with said main register-wheels, moving over fixed circular numerical scales indicative of the amounts deposited, mechanical connections between said crank-pointers and said indicator-disks whereby the latter display the same amounts that the pointers indicate, individual counting-registers to register individual deposits, detachably connected with the said main register-wheels through suitable connections, individual money-tills corresponding to said individual registers, and individual depressible keys controlling access to said money-tills, and controlling the operation of said individual registers, substantially as specified.

35. In a cash-registering machine, rotary crank-pointers common to all depositors, and moving over circular scales that show the amount of each deposit, a series of counters for two or more denominations of money, and a set of counters for each depositor to register each time the sum of the amount of money deposited by each person, clutches to engage these individual counters, depressible keys operating said clutches, individual symbols allotted to each depositor, with means for exhibiting said symbols, and operated by depressible keys allotted to the depositors and exhibiting when used the symbol of that depositor, substantially as described.

36. In a cash-registering machine, two rows of counters, one for cents and one for dollars or other money denominations, these counters mounted loosely on parallel shafts across the front of the machine, clutches to engage these counters and depressible keys to engage and disengage the clutches so that each key and counter will keep a separate register for a person to whom the key and counters are allotted, or of money received from particular sources or departments, said counters operated by rotary pointers geared therewith, substantially as specified.

37. In a cash-registering machine, rows of counters for cents and dollars or other money denominations, these counters mounted and turning loosely on parallel shafts set across the front of the machine, clutches to engage and disengage the counters with the shafts on which they are mounted, and depressible keys to operate the clutches and register amounts of money deposited by particular persons, or derived from particular sources or departments, and further counters to register the sum-total of all the counters, thereby showing a grand total of all deposits, substantially as described.

38. In a cash-register, rotary disks having numbers on their faces for indicating amounts deposited, one for large denominations and one for fractions thereof, main register-wheels concentric with but revoluble independently of said indicator-disks, pointers for indicating amounts deposited, on fixed circular scales, said pointers connected with said main register-wheels by sleeve connections, pins on said pointers encountering lugs on the indicator-disk shafts whereby said disks are made to indicate the same amounts as the former, ratchet-teeth on the register-wheel of high denomination, a vibratory pawl-and-rod connection between the register-wheel of low denomination and that of high denomination, and a stud on said wheel of low denomination operating said pawl and rod periodically during the revolution of said wheel, whereby the wheel of high denomination is periodically moved, substantially as specified.

39. In a cash-register, the combination with a framework, of a sliding drawer therein having separate compartments, a sliding cover-plate for each of said compartments, depressible drawer-releasing keys, and mechanism whereby the depression of one of said keys results in the opening of one of said compartments when the drawer is opened and in retaining the other compartment closed.

40. In a cash-register, the combination with a framework, of a cash-receptacle therein having separate compartments, covering devices for said compartments, a registering mechanism, and means whereby the machine in registering automatically opens one compartment and maintains the other compartment closed.

41. In a cash-register, the combination with accounting devices, of a series of independent cash-receptacles, locks for the same predetermining which receptacle shall be exposed in an operation of the machine, a main lock common to all of the receptacles for allowing the exposure of the selected receptacle, and means for actuating the accounting devices as an accompaniment to the exposure of a receptacle.

42. In a cash-register, the combination with accounting devices, of a series of independent cash-receptacles, independent covers for said receptacles, locks for said covers predetermining which receptacle shall be exposed in an operation of the machine, a main lock common to all of the receptacles for allowing the exposure of the selected receptacle, and means for actuating the accounting devices as an accompaniment to the exposure of a receptacle.

43. In a cash-register, a main depository-drawer having divisions or tills therein, means to separately lock the drawer and the tills and a series of depressible keys each of which unlocks the main drawer and one till to which the key pertains.

44. In a cash-register, the combination with a money-repository divided into independent compartments, guarding means for said compartments, and selective operating devices for unlocking the main repository and the particular compartment which it is desired to expose.

45. In a cash-register, a main repository-drawer divided into compartments, means to separately lock the drawer and the compartments, and a series of independent controlling devices for controlling the unlocking of the main drawer and one compartment to which any particular device pertains.

46. In a cash-register, a plurality of receptacles, a plurality of accounting devices, manipulating amount-controlling means common to all of the accounting devices, means for opening any desired receptacle, and means for operating the corresponding accounting mechanism.

47. In a cash-register, a plurality of receptacles, a plurality of registering mechanisms, manipulating amount-controlling means common to all the registering mechanisms, means for opening any desired receptacle, and means for operating a corresponding registering mechanism.

48. In a cash-register, a plurality of receptacles, a plurality of covers for said receptacles, a plurality of registering mechanisms, means for uncovering any desired receptacle, means for locking the covers over their receptacles, and means for operating the registering mechanism corresponding to the receptacle that is exposed.

49. In a cash-register, a plurality of receptacles, a plurality of movable covers therefor, a plurality of registering mechanisms, means for causing a relative movement between any one of the receptacles and its cover, means for locking each cover over its receptacle, means for predetermining which receptacle shall be uncovered, and means for operating the corresponding registering mechanism.

50. In a cash-register, a plurality of cash-receptacles, a plurality of covers therefor, a plurality of registering mechanisms, and means compelling the operation of the corresponding registering mechanism upon the uncovering of any cash-receptacle.

51. In a cash-register, a plurality of receptacles, a plurality of movable covers therefor, a plurality of registering mechanisms, and means compelling an operation of the corresponding registering mechanism for any receptacle uncovered, and so arranged that no other receptacle may be uncovered except it be accompanied by the operation of its corresponding registering mechanism.

52. In a cash-register, a plurality of receptacles, a plurality of movable covers therefor, a plurality of registering mechanisms, means for predetermining which receptacle shall be uncovered also arranged to control the operation of the corresponding registering mechanism, and means requiring a further operation of the machine for uncovering the selected receptacle.

53. In a cash-register, a drawer divided into a series of separate receptacles, a series of movable covers therefor, a plurality of registering mechanisms, means for releasing any cover desired, means for operating the corresponding registering mechanism, and means for holding the remaining covers over their receptacles.

54. In a cash-register, a drawer divided into a series of separate receptacles, a series of movable covers for said receptacles, means for securing each cover over its receptacle, means for releasing any desired cover, means for moving said drawer together with the remaining covers from beneath the released cover, a plurality of registering mechanisms, and means for operating the registering mechanism corresponding to the uncovered receptacle.

55. In a cash-register, a drawer divided into a series of separate receptacles, a series of independent covers for said receptacles, means for securing each cover over its receptacle, a series of amount-accounting mechanisms, and means for effecting an amount-recording operation of the corresponding accounting mechanism for each receptacle uncovered.

56. In a cash-register, a drawer divided into a series of separate receptacles, a series of independent covers for said receptacles, means for securing each cover over its receptacle, a series of keys for releasing any cover desired, a series of amount-accounting mechanisms, and means for effecting an amount-recording operation of the corresponding accounting mechanism for any receptacle uncovered.

57. In a cash-register, a drawer divided into a series of separate receptacles, a series of independent covers for said receptacles, a latch arranged to lock each cover over its receptacle, a series of pins arranged to be thrown each into engagement with one of said covers and its latch, means for throwing any one of said pins, a series of accounting mechanisms, and means compelling the operation of the accounting mechanism corresponding to the receptacle uncovered.

58. In a cash-register, a drawer divided into a series of separate receptacles, a series of independent covers for said receptacles, a latch arranged to lock each cover over its receptacle, a series of pins each arranged to be thrown into engagement with one of said covers and its latch, a series of keys arranged to control said pins, a series of accounting mechanisms, and means for operating the accounting mechanism corresponding to the receptacle uncovered.

59. In a cash-register, a drawer divided into a series of separate receptacles, a series of independent covers for said receptacles, a latch carried by each cover and arranged to lock it over its receptacle, a series of pins arranged to be thrown each into engagement with one of said latches, a series of keys controlling said pins, a series of accounting mechanisms and means for operating the accounting mechanism corresponding to the receptacle which is uncovered.

60. In a cash-register, a drawer divided into a series of separate receptacles, a series of independent covers therefor, a latch arranged to lock each cover over its receptacle, a series of pins arranged to be thrown each into engagement with one of said covers and its latch, a series of registering mechanisms, and a series of character-keys each arranged to throw one of said pins and the corresponding registering mechanism into operation.

61. In a cash-register, a plurality of receptacles, a plurality of registering mechanisms, one for each receptacle, an additional registering mechanism, manipulative amount-controlling means common to all of the registering mechanisms, means for opening any desired receptacle, and means for operating the corresponding registering mechanism with provisions for operating the additional registering mechanism.

62. In a cash-register, a plurality of receptacles, a plurality of independent accounting mechanisms, one for each receptacle, a registering mechanism, manipulative amount-controlling means common to all of the accounting mechanisms, means for opening any desired receptacle, and means for operating the corresponding accounting mechanism with provision for operating the registering mechanism.

63. In a cash-register a plurality of receptacles, a plurality of independent accounting mechanisms, one for each receptacle, a registering mechanism for registering the sum-total of all of the accounting mechanisms, manipulative amount-controlling means common to all of the accounting mechanisms, means for opening any desired receptacle, and means for operating the corresponding accounting mechanism, with provisions for operating the total-registering mechanism.

64. In a cash-register the combination with a series of independent accounting mechanisms, operating mechanism for the same, a general accounting mechanism, means for operating the general accounting mechanism arranged to set the special operating mechanism for operation, a series of independent receptacles corresponding to the special accounting mechanisms, and devices for effecting the operation of the special operating mechanism and exposing the desired receptacle.

65. In a cash-register, the combination with a series of independent special registers, of an operating mechanism for the same, a general register, means for operating the general register arranged to set the special register-operating mechanism, a series of independent receptacles corresponding to the special registers, and devices for effecting the operation of the register-operating mechanism and exposing the desired receptacle.

PATRICK LALOR.

Witnesses:
 JOHN B. TREGLOAN,
 UPTON SMITH.